(12) United States Patent
Teshima

(10) Patent No.: US 9,196,029 B2
(45) Date of Patent: Nov. 24, 2015

(54) THRESHOLD SETTING DEVICE FOR SETTING THRESHOLD USED IN BINARIZATION PROCESS, OBJECT DETECTION DEVICE, THRESHOLD SETTING METHOD, AND COMPUTER READABLE STORAGE MEDIUM

(71) Applicant: CASIO COMPUTER CO., LTD., Tokyo (JP)

(72) Inventor: Yoshihiro Teshima, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 194 days.

(21) Appl. No.: 13/959,253

(22) Filed: Aug. 5, 2013

(65) Prior Publication Data

US 2014/0093128 A1 Apr. 3, 2014

(30) Foreign Application Priority Data

Sep. 28, 2012 (JP) ................................ 2012-216637

(51) Int. Cl.
  G06K 9/00 (2006.01)
  G06T 7/00 (2006.01)
  G06T 5/00 (2006.01)

(52) U.S. Cl.
  CPC . *G06T 7/00* (2013.01); *G06T 5/009* (2013.01); *G06T 2207/10024* (2013.01); *G06T 2207/30204* (2013.01)

(58) Field of Classification Search
  None
  See application file for complete search history.

(56) References Cited

U.S. PATENT DOCUMENTS

| 2008/0266401 | A1* | 10/2008 | Fry et al. .................... 348/207.1 |
| 2010/0194886 | A1* | 8/2010 | Asari et al. .................... 348/148 |
| 2010/0214444 | A1* | 8/2010 | Teshima et al. ............ 348/231.3 |
| 2011/0293185 | A1* | 12/2011 | Silverbrook et al. ......... 382/182 |
| 2012/0113228 | A1* | 5/2012 | Konno et al. .................... 348/47 |
| 2013/0230209 | A1* | 9/2013 | Hashimoto et al. ........... 382/103 |
| 2013/0278748 | A1* | 10/2013 | Nakayama et al. ............. 348/87 |

FOREIGN PATENT DOCUMENTS

JP 2006-072667 A 3/2006

OTHER PUBLICATIONS

JP 07-057080 English machine translation,Mar. 3, 1995 Murayama et al.*

(Continued)

*Primary Examiner* — Nancy Bitar
(74) *Attorney, Agent, or Firm* — Holtz, Holtz, Goodman & Chick PC

(57) ABSTRACT

A threshold setting device, an object detection device, a threshold setting method, and a computer readable storage medium are shown. According to one implementation, the threshold setting device includes, an image acquisition unit, a ratio acquisition unit, and a setting unit. The image acquisition unit acquires an image including a specific object. The ratio acquisition unit acquires ratio information related to a ratio of a plurality of colors present in the specific object. The setting unit sets, based on the ratio information acquired by the ratio acquisition unit, a threshold used in a binarization process performed on the image including the specific object acquired by the image acquisition unit.

9 Claims, 4 Drawing Sheets

(56) References Cited

OTHER PUBLICATIONS

Japanese Office Action dated Feb. 10, 2015, issued in counterpart Japanese Application No. 2012-216637.

Nakao, et al., "A Threshold Selection Method for Character Images in a Document", The Institute of Electronics, Information and Communication Engineers, Nov. 12, 1993, vol. 93, No. 317, pp. 37-44.

* cited by examiner

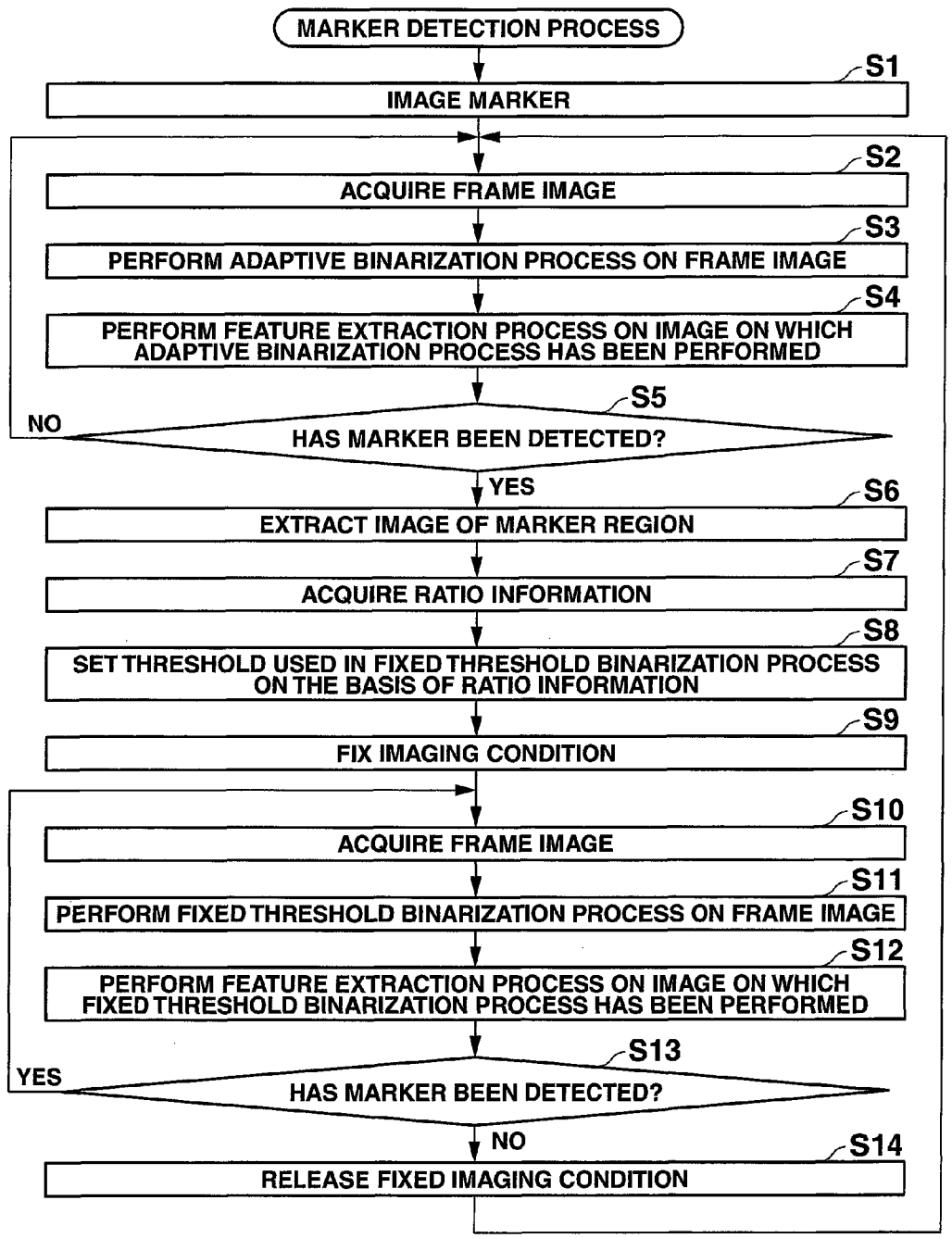

THRESHOLD SETTING DEVICE FOR SETTING THRESHOLD USED IN BINARIZATION PROCESS, OBJECT DETECTION DEVICE, THRESHOLD SETTING METHOD, AND COMPUTER READABLE STORAGE MEDIUM

CROSS-REFERENCE TO RELATED APPLICATIONS

The entire disclosure of Japanese Patent Application No. 2012-216637 filed on Sep. 28, 2012 including specification, claims, drawings and abstract are incorporated herein by reference in its entirety.

BACKGROUND OF THE INVENTION

1. Field of the Invention

The present invention relates to technology which sets a threshold used in detecting a marker image in augmented reality (AR) technology or the like.

2. Description of the Related Art

There has been known in the related art an image processing apparatus which, as augmented reality (AR) technology, displays a virtual object (such as a three-dimensional model) in association with an image of a marker (an actual object) in a captured image (refer to Japanese Laid-Open Patent Application Publication No. 2006-72667, for example).

On the basis of the result of an image analysis performed on a captured frame image, this image processing apparatus detects a tilt of a marker image in the frame image (such as a rotational angle with respect to a normal vision of the image within a display screen) and records the tilt of the marker image as an initial value. The image processing apparatus also calculates a relative difference, particularly a difference in a coordinate value, between a tilt of the marker in a frame image that is successively captured and the tilt recorded as the initial value. The image processing apparatus then performs a process to tilt the image of the virtual object along a predetermined vector on the basis of the calculated difference in the coordinate value and to successively display the image.

SUMMARY OF THE INVENTION

According to an aspect of the present invention, there is provided a threshold setting device including:

an image acquisition unit which acquires an image including a specific object;

a ratio acquisition unit which acquires ratio information related to a ratio of a plurality of colors present in the specific object; and a setting unit which sets, based on the ratio information acquired by the ratio acquisition unit, a threshold used in a binarization process performed on the image including the specific object acquired by the image acquisition unit.

According to another aspect of the present invention, there is provided an object detection device including:

an image acquisition unit which acquires an image including a specific object;

a ratio acquisition unit which acquires ratio information related to a ratio of a plurality of colors present in the specific object;

a setting unit which sets, based on the ratio information acquired by the ratio acquisition unit, a threshold used in a binarization process performed on the image including the specific object acquired by the image acquisition unit;

a binarization process unit which performs a binarization process on the image including the specific object based on the threshold set by the setting unit; and a detection unit which detects the specific object from the image including the specific object and binarized by the binarization process unit.

According to another aspect of the present invention, there is provided a method of setting a threshold by using a threshold setting device, the method including:

acquiring an image including a specific object;

acquiring ratio information related to a ratio of a plurality of colors present in the specific object; and setting, based on the acquired ratio information, a threshold used in a binarization process performed on the acquired image including the specific object.

According to another aspect of the present invention there is provided a non-transitory computer-readable storage medium in which a program is stored, the program allowing a computer in a threshold setting device to function as:

an image acquisition unit which acquires an image including a specific object;

a ratio acquisition unit which acquires ratio information related to a ratio of a plurality of colors present in the specific object; and a setting unit which sets, based on the ratio information acquired by the ratio acquisition unit, a threshold used in a binarization process performed on the image including the specific object acquired by the image acquisition unit.

BRIEF DESCRIPTION OF THE DRAWINGS

FIG. 2 is a flowchart illustrating an example of an operation pertaining to a marker detection process performed by the mobile terminal illustrated in FIG. 1;

DETAILED DESCRIPTION OF THE PREFERRED EMBODIMENTS

Figure 1:
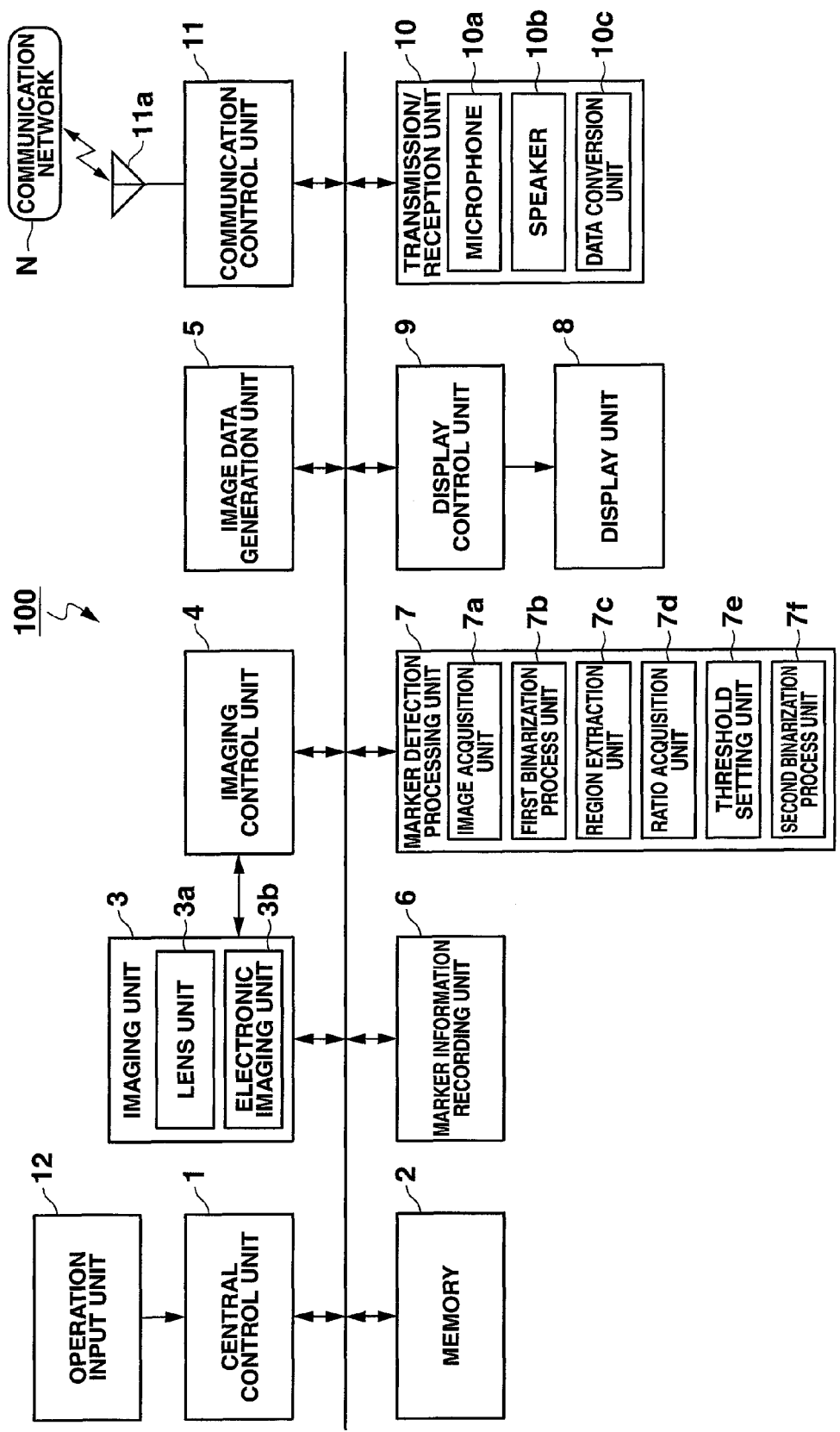
FIG. 1 is a block diagram illustrating a schematic configuration of a mobile terminal in an embodiment to which the present invention is applied.

A specific aspect of the present invention will be described below with reference to the drawings. Note that the scope of the invention is not to be limited to what is illustrated in the drawings.

FIG. 1 is a block diagram illustrating a schematic configuration of a mobile terminal 100 in an embodiment to which the present invention is applied.

As illustrated in FIG. 1, the mobile terminal 100 includes a central control unit 1, a memory 2, an imaging unit 3, an imaging control unit 4, an image data generation unit 5, a marker information recording unit 6, a marker detection processing unit 7, a display unit 8, a display control unit 9, a transmission/reception unit 10, a communication control unit 11, an operation input unit 12, and the like.

The mobile terminal 100 is configured by an imaging device including a communication function, a mobile station such as a mobile phone or a PHS (Personal Handy-phone System) used in a mobile communication network, or a PDA (Personal Data Assistants), for example.

The central control unit 1 controls each part of the mobile terminal 100. Specifically, the central control unit 1 includes a CPU (Central Processing Unit; not shown) controlling each part of the mobile terminal 100 and performs various control operations according to various processing programs (not shown).

The memory 2 is configured by a DRAM (Dynamic Random Access Memory), for example, and includes a buffer memory which temporarily records image information or the like, a working memory provided for the central control unit 1, a program memory in which various programs and data relevant to a function of the mobile terminal 100 are stored, and the like (none of which is shown).

Figure 3A:
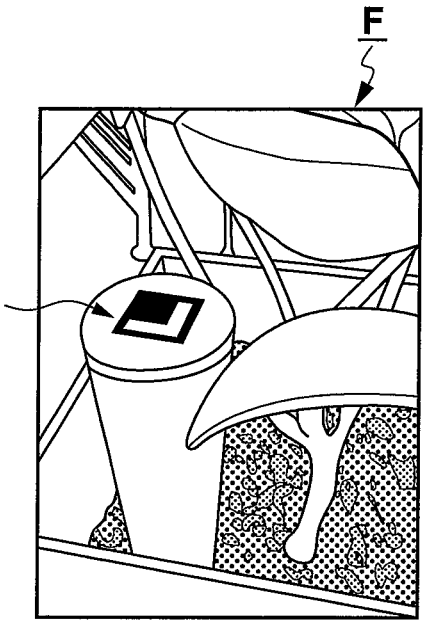
FIG. 3A is a diagram schematically illustrating an example of an image pertaining to the marker detection process illustrated in FIG. 2.

The imaging unit 3 images a specific object (such as a marker M; refer to FIG. 3B) and generates an image signal of a frame image F (refer to FIG. 3A).

The specific object here may be a two-dimensional image or a three-dimensional body. The square marker M (refer to FIG. 3B) on which a hollow, substantial letter "L" is delineated is an example of the specific object being a two-dimensional image.

The imaging unit 3 includes a lens unit 3a and an electronic imaging unit 3b.

The lens unit 3a is configured by a plurality of lenses such as a zoom lens and a focus lens.

The electronic imaging unit 3b is configured by an image sensor such as a CCD (Charge Coupled Device) or a CMOS (Complementary Metal-oxide Semiconductor) and converts an optical image having passed through various lenses in the lens unit 3a into a two-dimensional image signal.

Although not shown, the imaging unit 3 may include a diaphragm which adjusts the amount of light passing through the lens unit 3a.

The imaging control unit 4 controls the object imaging performed by the imaging unit 3. That is, the imaging control unit 4 includes a timing generator, a driver and the like that are not shown. The imaging control unit 4 uses the timing generator and the driver to scan-drive the electronic imaging unit 3b, and then the electronic imaging unit 3b converts the optical image into the two-dimensional image signal at every predetermined cycle. The imaging control unit 4 thereafter reads the frame image F one screen at a time from an imaging region of the electronic imaging unit 3b, and outputs the frame image F to the image data generation unit 5.

The imaging control unit 4 also performs adjustment control on an imaging condition of an object such as AF (an automatic focus process), AE (an automatic exposure process), and AWB (automatic white balance).

The image data generation unit 5 performs gain adjustment as necessary on a signal of an analog value of the frame image F transferred from the electronic imaging unit 3b for each of RGB components, samples/holds the signal in a sample-hold circuit (not shown), converts the signal into digital data by an A/D converter (not shown), performs color processing including a pixel interpolation process and a γ correction process in a color processing circuit (not shown), and thereafter generates a luminance signal Y and color difference signals Cb, Cr (YUV data) of a digital value.

The image data generation unit 5 further reduces the generated YUV data of the frame image F by a predetermined scale factor in both horizontal and vertical directions and generates image data with low resolution (such as the size of VGA or QVGA) adapted for live view display. Specifically, the image data generation unit 5 generates the image data with the low resolution adapted for live view display from the YUV data of the frame image F at a predetermined timing corresponding to a predetermined display frame rate of a live view image displayed by the display unit 8.

Then, the image data generation unit 5 sequentially outputs the generated YUV data of each frame image F to the memory 2, and stores the data in the memory 2.

Figure 3B:
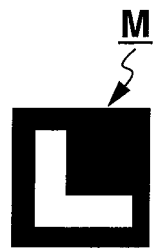
FIG. 3B is a diagram schematically illustrating an example of an image pertaining to the marker detection process illustrated in FIG. 2.

The marker information recording unit 6 records various information relevant to the marker M (refer to FIG. 3B).

Specifically, the marker information recording unit 6 records ratio information related to a ratio R of white to black in a black-and-white marker (a specific object) M, for example. The marker information recording unit 6 may also record shape information or dimension information related to the shape or the dimension of the marker M, respectively (such as a square with one side equal to 12 mm).

Note that the color, the shape, and the dimension of the aforementioned marker M are illustrated as an example and are not limited to what is described herein. The color, the shape, and the dimension can be modified at will as deemed appropriate.

The marker detection processing unit 7 includes an image acquisition unit 7a, a first binarization process unit 7b, a region extraction unit 7c, a ratio acquisition unit 7d, a threshold setting unit 7e, and a second binarization process unit 7f.

While being configured by a logic circuit as an example, each part of the marker detection processing unit 7 is not to be limited to such configuration.

The image acquisition unit 7a successively acquires a plurality of frame images F.

That is, the image acquisition unit 7a successively acquires a plurality of images in which the marker (the specific object) M is imaged successively. Specifically, the image acquisition unit 7a successively acquires, from the memory 2, image data (such as luminance data) of the plurality of frame images F with a predetermined resolution, etc. successively generated by the image data generation unit 5 after the marker M has been successively imaged by the imaging unit 3.

The first binarization process unit 7b performs an adaptive binarization process on the frame image F.

That is, the first binarization process unit 7b performs the adaptive binarization process on each piece of the image data of the plurality of frame images F, etc. acquired by the image acquisition unit 7a, the adaptive binarization process binarizing the data by setting a locally different threshold in each predetermined region of the frame image F. The first binarization process unit 7b thereafter generates image data of a first binarized image (not shown). Specifically, the first binarization process unit 7b determines a weighted average of surrounding pixels as the threshold used in the adaptive binarization process and sets the weight such that the pixels have a normal distribution centered around a pixel of interest.

The frame image F to be processed is a frame image F which is generated by the image data generation unit 5 after being automatically subjected to the adjustment control of the imaging condition such as exposure and white balance by the imaging control unit 4 when the imaging unit images the specific object.

Here, the detailed description of the adaptive binarization process will be omitted as it is a well known technology.

The region extraction unit 7c extracts an image of a marker region S from the frame image F.

That is, the region extraction unit 7c extracts the image of the marker region S including the marker (specific object) M, from the frame image F acquired by the image acquisition unit 7a. Specifically, the region extraction unit 7c performs a predetermined feature extraction process on the image data of the first binarized image that is generated by the first binarization process unit 7b which has performed the adaptive binarization process on the frame image F acquired by the image acquisition unit 7a. The region extraction unit 7c also performs a predetermined feature extraction process on image data of a second binarized image G generated by the second binarization process unit 7f which performs a fixed threshold binarization process on the frame image F acquired by the image acquisition unit 7a. Subsequently, the region extraction unit 7c acquires a position coordinate for each of four corners configuring the square marker M on which the hollow, substantial letter "L" is delineated, and extracts a portion inside the four corners as the image of the marker region S.

Here, the detailed description of the feature extraction process will be omitted as it is a well known technology.

The ratio acquisition unit 7d acquires the ratio information related to the marker M.

That is, the ratio acquisition unit 7d acquires the ratio information related to the ratio R of a plurality of colors present in the marker (the specific object) M. Specifically, the ratio acquisition unit 7d acquires the ratio information related to the ratio R of white to black in the image of the marker M, for example, by reading the information from the marker information recording unit 6.

The threshold setting unit 7e sets the threshold used in binarizing the frame image F by the second binarization process unit 7f.

That is, on the basis of the ratio information acquired by the ratio acquisition unit 7d, the threshold setting unit 7e sets the threshold used in binarizing the image including the marker (the specific object) M that is acquired by the image acquisition unit 7a. Specifically, the threshold setting unit 7e calculates an evaluation value a for all thresholds according to the following expression (1), for example, where the evaluation value a is obtained by weighting a degree of separation d pertaining to the binarization process employing a discriminant analysis method with weight w based on the ratio information. The threshold setting unit 7e thereafter compares the plurality of evaluation values a calculated, specifies a threshold having the greatest evaluation value a among the above, and sets the threshold as the threshold used in the fixed threshold binarization process performed by the second binarization process unit 7f.

[Mathematical Expression 1]

$$a = wd \quad \text{Expression (1)}$$

[Mathematical Expression 2]

$$d = n_1 n_2 (m_1 - m_2)^2 \quad \text{Expression (2)}$$

The binarization process employing a discriminant analysis method binarizes an image on the basis of variance of pixel values (such as luminance values) of an image to be processed (the image of the marker region S) while specifying a threshold with a maximum degree of separation d (refer to expression (2)) between two classes of a histogram of the pixel values separated by a temporary threshold. This degree of separation d becomes larger as the inter-class variance between the two separated classes becomes larger or each intra-class variance becomes smaller.

In expression (2), "$n_1$" denotes a pixel number of one of the two separated classes (such as a class corresponding to black) whereas "$m_1$" denotes an average of pixel values of the one class. On the other hand, "$n_2$" denotes a pixel number of another class of the two classes, different from the one class (such as a class corresponding to white) whereas "$m_2$" denotes an average of pixel values of the other class.

[Mathematical Expression 3]

$$w = \frac{1}{\sqrt{2\pi\sigma^2}} \exp\left(-\frac{(n_1/n_2 - R)^2}{2\sigma^2}\right) \quad \text{Expression (3)}$$

The weight w (refer to expression (3)) based on the ratio information is provided such that the degree of weighting varies on the basis of a ratio ($n_1/n_2$) of the pixel numbers between the two separated classes, the ratio R of white to black in the black-and-white marker M, and total variance ($\sigma$) of the pixel values of the image of the marker region S.

This means that the weight w becomes larger as the ratio ($n_1/n_2$) of the pixel numbers between the two classes approaches the ratio R of white to black in the marker M.

In addition, the weight w becomes larger as the total variance ($\sigma$) of the pixel values of the image of the marker region S becomes smaller. In other words, the larger the total variance ($\sigma$), the closer a threshold to the threshold set by the discriminant analysis method, whereas the smaller the total variance ($\sigma$), the closer a threshold to a threshold set by a P-tile method (Percentile Method).

Note that in expression (3), "$\sigma$" denotes the total variance equal to the sum of the inter-class variance and the intra-class variance of the pixel values of the image to be processed (the image of the marker region S), while "exp" denotes an exponential function with the base equal to Napier's constant e.

The method of setting the threshold used in the fixed threshold binarization process described above as an example is not limited to what is described herein, and can be modified at will as deemed appropriate.

When the marker M is imaged at an angle, for example, the attitude of the marker M relative to the terminal itself is tilted, in which case the ratio R of white to black in the black-and-white marker M may be corrected on the basis of the relative attitude or, alternatively, the image of the marker region S following a predetermined rectangular conversion process may be used as the image to be processed.

The second binarization process unit 7f performs the fixed threshold binarization process on the frame image F.

That is, on the basis of the threshold set by the threshold setting unit 7e, the second binarization process unit 7f performs the fixed threshold binarization process on the frame image F acquired by the image acquisition unit 7a. Specifically, the second binarization process unit 7f performs the fixed threshold binarization process on each piece of the image data of the plurality of frame images F, etc. acquired by the image acquisition unit 7a, the fixed threshold binarization process binarizing the image data by the threshold set by the threshold setting unit 7e. The second binarization process unit 7f then generates the image data of the second binarized image G (refer to FIG. 4A).

The second binarization process unit 7f may also perform the fixed threshold binarization process with the imaging condition such as exposure or white balance fixed by the imaging control unit 4 after the image of the marker region S has been extracted by the region extraction unit 7c.

The display unit 8 configured by a liquid crystal display panel or the like displays an image (such as a live view image) imaged by the imaging unit 3 on a display screen on the basis of a video signal transmitted from the display control unit 9.

The display control unit 9 performs control to read the image data for display temporarily stored in the memory 2 and to display the image data on the display unit 8.

Specifically, the display control unit 9 includes a VRAM (Video Random Access Memory), a VRAM controller, a digital video encoder, and the like. The digital video encoder reads the luminance signal Y and the color difference signals Cb and Cr, which are read from the memory 2 under control of the central control unit 1 and stored in the VRAM (not shown), from the VRAM via the VRAM controller at a predetermined reproduction frame rate (such as 30 fps), generates the video signal on the basis of these pieces of data, and then outputs the signal to the display unit 8.

For example, the display control unit 9 displays the plurality of frame images F, etc. on the display unit 8 in live view while successively updating the plurality of frame images F, etc. at a predetermined display frame rate, the plurality of frame images F, etc. being imaged by the imaging unit 3 and the imaging control unit 4 and generated by the image data generation unit 5. Moreover, the display control unit 9 successively acquires image data of a virtual image from the memory 2, for example, and displays the virtual image successively on the display unit 8 in live view. That is, the display control unit 9 displays the virtual image (not shown) successively on the display unit 8 in live view, the virtual image being formed by overlaying a virtual object (such as a three-dimensional model; not shown) corresponding to the marker M onto the image of the marker region S among the plurality of frame images F, etc. generated by the image data generation unit 5.

The transmission/reception unit 10 communicates with an external user of an external device connected via a communication network N.

Specifically, the transmission/reception unit 10 includes a microphone 10*a*, a speaker 10*b*, a data conversion unit 10*c*, and the like. The transmission/reception unit 10 performs an A/D conversion process by the data conversion unit 10*c* on the transmitted voice of a user input from the microphone 10*a* and outputs transmitted voice data to the central control unit 1. The transmission/reception unit 10 also performs, by the data conversion unit 10*c*, a D/A conversion process on voice data such as input received voice data that is output from the communication control unit 11 under control of the central control unit 1 and outputs the data from the speaker 10*b*.

The communication control unit 11 transmits and receives data via the communication network N and a communication antenna 11*a*.

That is, the communication antenna 11*a* is an antenna capable of transmitting/receiving data corresponding to a predetermined communication scheme (such as a W-CDMA (Wideband Code Division Multiple Access) scheme or a GSM (Global System for Mobile Communications; Registered Trademark) scheme) which is adopted in the communication established between the mobile terminal 100 and a radio base station (not shown). According to a communication protocol corresponding to the predetermined communication scheme, the communication control unit 11 transmits/receives data to/from the radio base station via the communication antenna 11*a* in a communication channel set by the communication scheme.

That is, on the basis of an input instruction signal output from the central control unit 1, the communication control unit 11 transmits/receives, to/from the external device of a communication partner, voice in a call established or electronic mail data communicated with an external user of the external device.

Note that the configuration of the communication control unit 11 is illustrated as an example and can be modified at will as deemed appropriate without being limited to what is described herein. Although not shown, for example, the configuration may be equipped with a wireless LAN module to be able to access the communication network N via an access point.

The communication network N is a communication network which connects the mobile terminal 100 via the radio base station or a gateway server (not shown). Moreover, the communication network N is constructed by using a leased line or an existing public line and can apply various line configurations such as a LAN (Local Area Network) or a WAN (Wide Area Network). The communication network N further includes: various communication networks such as a telephone line network, an ISDN line network, a leased line, a mobile communication network, a communication satellite link, or a CATV line network; an IP network; a VoIP (Voice over Internet Protocol) gateway; and an Internet Service Provider, for example.

The operation input unit 12 is provided to input various instructions to the terminal itself.

Specifically, the operation input unit 12 includes: a shutter button relevant to an object imaging instruction; an up/down/left/right cursor button and a determination button relevant to a mode/function selecting instruction; a communication-related button relevant to an instruction to execute an incoming/outgoing call as well as transmission/reception of an electronic mail; and various buttons such as a number button and a symbol button relevant to a text inputting instruction (none of which is shown).

Once a user has operated the various buttons, the operation input unit 12 outputs an operation instruction corresponding to the operated button to the central control unit 1. The central control unit 1 controls each unit according to the input operation instruction output from the operation input unit 12 so that each unit executes a predetermined action (such as imaging an object, originating/receiving a call, or transmitting/receiving an electronic mail).

Note that the operation input unit 12 may include a touch panel provided in integration with the display unit 8, in which case the operation input unit 12 may output to the central control unit 1 an operation instruction corresponding to a predetermined operation executed by a user onto the touch panel.

Now, a marker detection process applying the threshold setting method by the mobile terminal 100 will be described with reference to FIGS. 2 and 3.

FIG. 2 is a flowchart illustrating an example of an operation pertaining to the marker detection process. FIG. 3A is a diagram schematically illustrating an example of the frame image F, while FIG. 3B is a diagram schematically illustrating an example of the marker M.

Note that the marker M detected by the following marker detection process is disposed at a predetermined position of a pot into which a houseplant is potted, for example.

As illustrated in FIG. 2, the imaging control unit 4 first makes the imaging unit 3 image the marker M, while the image data generation unit 5 generates the image data of the plurality of frame images F, etc. transferred from the electronic imaging unit 3*b* (step S1; refer to FIG. 3A). Here, the imaging control unit 4 automatically performs control to adjust the imaging condition such as exposure and white balance. The image data generation unit 5 then sequentially outputs the generated YUV data of each frame image F to the memory 2 so that the memory 2 stores the data.

The image acquisition unit 7a of the marker detection processing unit 7 acquires from the memory 2 the image data generated by the image data generation unit 5, the image data corresponding to any one of the frame images F (step S2). Subsequently, the first binarization process unit 7b performs the adaptive binarization process where the image is binarized by setting a locally different threshold in each predetermined region of the frame image F acquired by the image acquisition unit 7a, thereby generating the image data of the first binarized image (step S3).

Next, the region extraction unit 7c performs a predetermined feature extraction process on the image data of the first binarized image generated as a result of the adaptive binarization process performed by the first binarization process unit 7b (step S4), and determines whether or not the square marker M on which the hollow, substantial letter "L" is delineated has been detected (step S5).

When it is determined that the marker M has not been detected (step S5; NO), the CPU of the central control unit 1 returns the process to step S2 and controls the execution of the process that follows. That is, each process performed in steps S2 to S4 is repeatedly executed until it is determined that the marker M has been detected in step S5 (step S5; YES).

When it is determined that the marker M has been detected (step S5; YES), on the other hand, the region extraction unit 7c acquires the position coordinate of each of the four corners configuring the marker M and extracts the portion inside the four corners as the image of the marker region S (step S6; refer to FIG. 3A).

Subsequently, the ratio acquisition unit 7d reads and acquires the ratio information related to the ratio R of white to black of the image of the marker M from the marker information recording unit 6 (step S7).

On the basis of the ratio information acquired by the ratio acquisition unit 7d, the threshold setting unit 7e calculates the evaluation value a according to the following expression (1), the evaluation value a being obtained by weighting the degree of separation d pertaining to the binarization process employing the discriminant analysis method with the weight w based on the ratio information. The threshold setting unit then sets the threshold with the greatest evaluation value a as the threshold used in the fixed threshold binarization process (step S8).

[Mathematical Expression 4]

$$a = wd \qquad \text{Expression (1)}$$

The imaging control unit 4 thereafter keeps the imaging condition such as exposure or white balance fixed (step S9).

Next, the image acquisition unit 7a acquires the image data of any one of the frame images F from the memory 2, the image data being generated by the image data generation unit 5 after the marker M has been imaged by the imaging unit 3 (step S10).

Figure 4A:
FIG. 4A is a diagram schematically illustrating an example of a binarized image pertaining to the marker detection process illustrated in FIG. 2.

The second binarization process unit 7f thereafter generates the image data of the second binarized image G by performing the fixed threshold binarization process, which binarizes using the threshold set by the threshold setting unit 7e, on the image data of the frame image F acquired by the image acquisition unit 7a (step S11; refer to FIG. 4A).

Then, the region extraction unit 7c as a detection unit performs a predetermined feature extraction process on the image data of the second binarized image G generated as a result of the fixed threshold binarization process performed by the second binarization process unit 7f (step S12), and determines whether or not the square marker M on which the substantial letter "L" is delineated has been detected (step S13).

When it is determined that the marker M has been detected (step S13; YES), the CPU of the central control unit 1 returns the process to step S10 and controls the execution of the process that follows. That is, each process in steps S10 to S12 is repeatedly executed until it is determined that the marker M has been detected in step S13 (step S13; YES).

When it is determined that the marker M has not been detected (step S13; NO), on the other hand, the imaging control unit 4 releases the fixed imaging condition such as exposure or white balance (step S14), and the CPU of the central control unit 1 returns the process to step S2 and controls the execution of the process that follows.

Moreover, when it is determined in step S13 that the marker M has been detected (step S13; YES), the marker detection processing unit 7 solves a predetermined coordinate conversion equation to convert a coordinate of each point of the marker M in three-dimensional space into a two-dimensional plane coordinate corresponding to the frame image F. The display control unit 9 then displays a virtual image on the display unit 8 in live view, the virtual image being formed by overlaying a virtual object corresponding to the marker M on the image of the marker region S in the frame image F at the position and the attitude obtained after the coordinate has been converted.

According to the mobile terminal 100 of the present embodiment, the threshold used in the fixed threshold binarization process can be set by using a ratio R of a plurality of colors present in a known specific object, because the threshold used in the fixed threshold binarization process performed on the image of a specific object is set on the basis of the ratio information related to the ratio R of the plurality of colors present in the specific object (the marker M), as described above. The threshold can be set properly even when one is in an environment where the contrast in the frame image F of the specific object (the image of the marker region S) changes under direct sunlight or shade, or in a situation where it is difficult to extract the image of the specific object out of the frame image F.

Figure 4B:
FIG. 4B is a diagram schematically illustrating an example of a binarized image pertaining to the marker detection process illustrated in FIG. 2.

This means that the shape feature of the marker M may not be properly represented in the binarized frame image F depending on the environment in which the marker M is arranged, when the frame image F is binarized by setting the threshold used in the binarization process without considering the ratio R of the plurality of colors present in the specific object (refer to FIG. 4B). In contrast, the second binarized image G in which the shape feature of the marker M is properly represented can be generated by applying the threshold setting process described in the present embodiment (refer to FIG. 4A), whereby the image of the marker region S within the image can be properly specified.

The threshold used in the fixed threshold binarization process can also be set on the basis of the variance of the pixel values in the image of the specific object. Specifically, the threshold used in the fixed threshold binarization process is set on the basis of the evaluation value a that is obtained by weighting, on the basis of the ratio information, the degree of separation d between two classes into which the pixel values of the image of the specific object are separated by a temporary threshold. As a result, the threshold can be set properly on the basis of the evaluation value a that is obtained by weighting the degree of separation d based on the inter-class variance or each intra-class variance of the two classes with the ratio R of the plurality of colors present in the known specific object.

Moreover, the degree of weighting the degree of separation d based on the ratio information varies on the basis of the ratio information related to the ratio (n1/n2) of the pixel numbers between two classes and the ratio R of white to black in the black-and-white marker M as well as the total variance (σ) of the pixel values of the image of the marker region S, whereby the degree of separation d between the two classes can be weighted properly in the binarization process based on the variance of the pixel values of the image to be processed. Accordingly, the threshold can be set properly on the basis of the calculated evaluation value a.

Furthermore, the image of the specific object can be binarized properly by performing the fixed threshold binarization process on the image of the specific object on the basis of the set threshold. As a result, the estimation of the attitude and the position of the specific object (marker M) as well as the display of the virtual object corresponding to the marker M can be performed properly.

Note that the present invention is not to be limited to the aforementioned embodiment and may make various improvements and design modifications without departing from the spirit of the present invention.

While the fixed threshold binarization process is performed on the image of the specific object on the basis of the set threshold in the aforementioned embodiment, for example, the fixed threshold binarization process need not be performed. Therefore, whether to provide the second binarization process unit 7f can be determined freely.

Moreover, the configuration of the mobile terminal 100 in the aforementioned embodiment has been illustrated as an example and is not to be limited to what has been described. As deemed appropriate, the configuration can be modified at will as long as the configuration includes at least an image acquisition unit, a ratio acquisition unit, and a setting unit. In other words, the mobile terminal 100 need not include the imaging unit 3, in which case an image imaged by an external imaging device may be acquired to perform the process which sets the threshold used in binarizing an image of a specific object.

The aforementioned embodiment is configured where the image acquisition unit 7a, the ratio acquisition unit 7d, and the threshold setting unit 7e are operated under control of the central control unit 1 in the mobile terminal 100 to perform the function as the image acquisition unit, the ratio acquisition unit, and the setting unit. However, the configuration is not to be limited to what has been described, meaning that the mobile terminal may be configured where a predetermined program is executed by the CPU of the central control unit 1 to perform the functions.

That is, a program including an image acquisition process routine, a ratio acquisition process routine, and a setting process routine is stored beforehand in a program memory which stores a program. By the image acquisition process routine, the CPU of the central control unit 1 may be adapted to function as a unit which acquires the image including the specific object. By the ratio acquisition process routine, the CPU of the central control unit 1 may be adapted to function as a unit which acquires the ratio information pertaining to the ratio of the plurality of colors present in the specific object. By the setting process routine, the CPU of the central control unit 1 may be adapted to function as a unit which sets the threshold used in binarizing the acquired image including the specific object on the basis of the acquired ratio information.

Likewise, according to the present embodiment, a predetermined program or the like may be executed by the CPU of the central control unit 1 to perform the function as a processing unit and a detection unit.

Furthermore, a nonvolatile memory such as a flash memory or a transportable recording medium such as a CD-ROM in addition to a ROM and a hard disk can be applied as the computer readable medium in which a program for executing each of the aforementioned processes is stored. A carrier wave can also be applied as a medium which provides program data via a predetermined communication line.

Although various exemplary embodiments have been shown and described, the invention is not limited to the embodiments shown. Therefore, the scope of the invention is intended to be limited solely by the scope of the claims that follow and its equivalents.

What is claimed is:

1. A threshold setting device comprising:
an image acquisition unit which acquires an image including a specific object;
a ratio acquisition unit which acquires ratio information related to a ratio of a plurality of colors present in the specific object; and
a setting unit which sets, based on the ratio information acquired by the ratio acquisition unit, a threshold used in a binarization process performed on the image including the specific object acquired by the image acquisition unit,
wherein pixel values of the image including the specific object are separated into two classes by a temporary threshold, and
wherein the setting unit (i) calculates, for a plurality of the temporary thresholds, an evaluation value by weighting with a larger weight a degree of separation between the two classes separated by the temporary threshold, as a ratio of a pixel number of the two classes approaches the ratio of the plurality of colors indicated in the ratio information, and (ii) sets, from among the plurality of the temporary thresholds, a temporary threshold with a largest calculated evaluation value as the threshold used in the binarization process.

2. The threshold setting device according to claim 1, wherein the setting unit calculates the evaluation value by weighting the degree of separation with a larger weight as total variance of the pixel values of the image including the specific object becomes smaller.

3. The threshold setting device according to claim 1, further comprising:
a binarization process unit which performs the binarization process on the image including the specific object based on the threshold set by the setting unit.

4. The threshold setting device according to claim 1, wherein the specific object is a marker.

5. An object detection device comprising:
an image acquisition unit which acquires an image including a specific object;
a ratio acquisition unit which acquires ratio information related to a ratio of a plurality of colors present in the specific object;
a setting unit which sets, based on the ratio information acquired by the ratio acquisition unit, a threshold used in a binarization process performed on the image including the specific object acquired by the image acquisition unit;
a binarization process unit which performs the binarization process on the image including the specific object based on the threshold set by the setting unit; and
a detection unit which detects the specific object from the image including the specific object and binarized by the binarization process unit,
wherein pixel values of the image including the specific object are separated into two classes by a temporary threshold, and wherein the setting unit (i) calculates, for a plurality of the temporary thresholds, an evaluation value by weighting with a larger weight a degree of separation between the two classes separated by the temporary threshold, as a ratio of a pixel number of the two classes approaches the ratio of the plurality of colors indicated in the ratio information, and (ii) sets, from among the plurality of the temporary thresholds, a temporary threshold with a largest calculated evaluation value as the threshold used in the binarization process.

6. The object detection device according to claim 5, further comprising:
   a display unit; and
   a display control unit which displays, on the display unit, a virtual object corresponding to the specific object detected by the detection unit.

7. The object detection device according to claim 6,
   wherein the specific object is a marker, and
   wherein the display control unit displays the marker on the display unit and displays the virtual object overlaid on the marker.

8. A method of setting a threshold by using a threshold setting device, the method comprising:
   acquiring an image including a specific object;
   acquiring ratio information related to a ratio of a plurality of colors present in the specific object; and
   setting, based on the acquired ratio information, a threshold used in a binarization process performed on the acquired image including the specific object,
   wherein pixel values of the image including the specific object are separated into two classes by a temporary threshold, and
   wherein the setting comprises:
      calculating, for a plurality of the temporary thresholds, an evaluation value by weighting with a larger weight a degree of separation between the two classes separated by the temporary threshold, as a ratio of a pixel number of the two classes approaches the ratio of the plurality of colors indicated in the ratio information, and
      setting, from among the plurality of the temporary thresholds, a temporary threshold with a largest calculated evaluation value as the threshold used in the binarization process.

9. A non-transitory computer-readable storage medium having a program stored thereon that is executable by a computer in a threshold setting device, the program being executable by the computer to control the computer to perform functions comprising:
   acquiring an image including a specific object;
   acquiring ratio information related to a ratio of a plurality of colors present in the specific object; and
   setting, based on the acquired ratio information, a threshold used in a binarization process performed on the acquired image including the specific object,
   wherein pixel values of the image including the specific object are separated into two classes by a temporary threshold, and
   wherein the setting comprises:
      calculating, for a plurality of the temporary thresholds, an evaluation value by weighting with a larger weight a degree of separation between the two classes separated by the temporary threshold, as a ratio of a pixel number of the two classes approaches the ratio of the plurality of colors indicated in the ratio information, and
      setting, from among the plurality of the temporary thresholds, a temporary threshold with a largest calculated evaluation value as the threshold used in the binarization process.

\* \* \* \* \*